United States Patent
Coulomb et al.

(10) Patent No.: US 12,066,355 B2
(45) Date of Patent: Aug. 20, 2024

(54) SNIFFER PROBE AND LEAK DETECTOR

(71) Applicant: PFEIFFER VACUUM, Annecy (FR)

(72) Inventors: Julien Coulomb, Annecy (FR); Cyrille Nomine, Annecy (FR)

(73) Assignee: PFEIFFER VACUUM, Annecy (FR)

( * ) Notice: Subject to any disclaimer, the term of this patent is extended or adjusted under 35 U.S.C. 154(b) by 228 days.

(21) Appl. No.: 17/636,136

(22) PCT Filed: Sep. 11, 2020

(86) PCT No.: PCT/EP2020/075440
§ 371 (c)(1),
(2) Date: Feb. 17, 2022

(87) PCT Pub. No.: WO2021/052879
PCT Pub. Date: Mar. 25, 2021

(65) Prior Publication Data
US 2022/0291071 A1   Sep. 15, 2022

(30) Foreign Application Priority Data

Sep. 20, 2019 (FR) .................................... 19 10415

(51) Int. Cl.
*G01M 3/20* (2006.01)
*G01M 3/22* (2006.01)
(52) U.S. Cl.
CPC ............ *G01M 3/205* (2013.01); *G01M 3/223* (2013.01)
(58) Field of Classification Search
None
See application file for complete search history.

(56) References Cited

U.S. PATENT DOCUMENTS

| 3,427,862 A | * | 2/1969 | Hubner | G01N 33/0011 73/31.05 |
| 4,369,647 A | | 1/1983 | Shigemori et al. | |
| 5,445,026 A | * | 8/1995 | Eagan | G01N 29/14 73/591 |

(Continued)

FOREIGN PATENT DOCUMENTS

| DE | 2 242 290 A1 | 2/1974 |
| JP | 57-162543 U | 10/1982 |

(Continued)

OTHER PUBLICATIONS

International Search Report and Written Opinion issued Oct. 13, 2020 in PCT/EP2020/075440, filed on Sep. 11, 2020, 12 pages.

(Continued)

*Primary Examiner* — Patrick Assouad
*Assistant Examiner* — Mark A Shabman
(74) *Attorney, Agent, or Firm* — Oblon, McClelland, Maier & Neustadt, L.L.P.

(57) ABSTRACT

A sniffer probe for a leak detector for monitoring the leaktightness of an object to be tested by tracer gas includes an end piece created in the form of a rigid tube, a housing, a connection member connecting the end piece to the housing, and a sampling duct to sample a gas at a first end of the end piece. The connection member includes a main body that is elastically deformable such that it can adopt a deformed position, making it possible for the end piece to pivot when acted upon by a force and to return to the initial rest position.

18 Claims, 5 Drawing Sheets

(56) References Cited

U.S. PATENT DOCUMENTS

| | | | |
|---|---|---|---|
| 6,079,275 A * | 6/2000 | Komninos | G01H 1/00 73/661 |
| 7,051,577 B2 * | 5/2006 | Komninos | G01M 3/24 73/40.7 |
| 7,588,726 B1 | 9/2009 | Mouradian et al. | |
| 9,772,271 B2 * | 9/2017 | Peacock | G01N 15/06 |
| 10,180,371 B2 * | 1/2019 | Duerr | G01N 29/24 |
| 2003/0159495 A1 * | 8/2003 | Cardinale | G01N 1/24 73/23.2 |
| 2012/0151991 A1 * | 6/2012 | Ester | G01N 1/2258 73/23.31 |
| 2016/0202138 A1 | 7/2016 | Wetzig | |
| 2019/0128765 A1 * | 5/2019 | Hadj-Rabah | G01M 3/20 |
| 2020/0094035 A1 * | 3/2020 | Greep | A61B 90/08 |

FOREIGN PATENT DOCUMENTS

| | | | | |
|---|---|---|---|---|
| JP | 2002-14017 A | | 1/2022 | |
| WO | WO-2008064964 A1 * | | 6/2008 | G01M 3/205 |

OTHER PUBLICATIONS

Japanese Office Action issued Mar. 5, 2024 in Japanese Application No. 2022-517744 with English Summary, 5 pgs.

\* cited by examiner

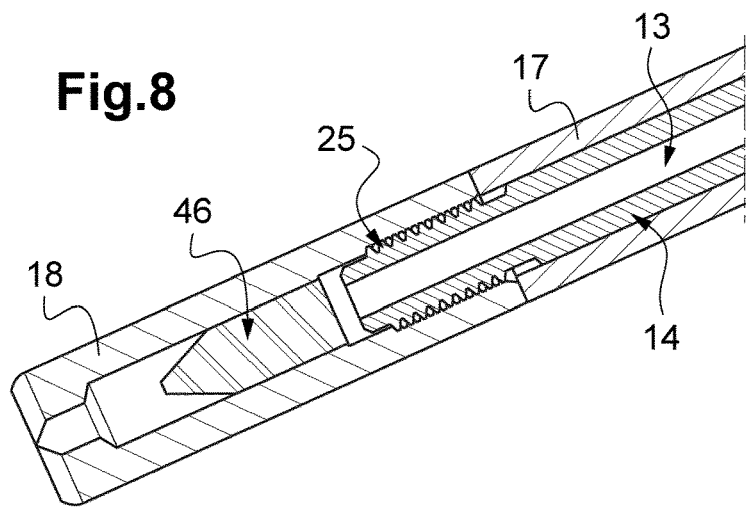
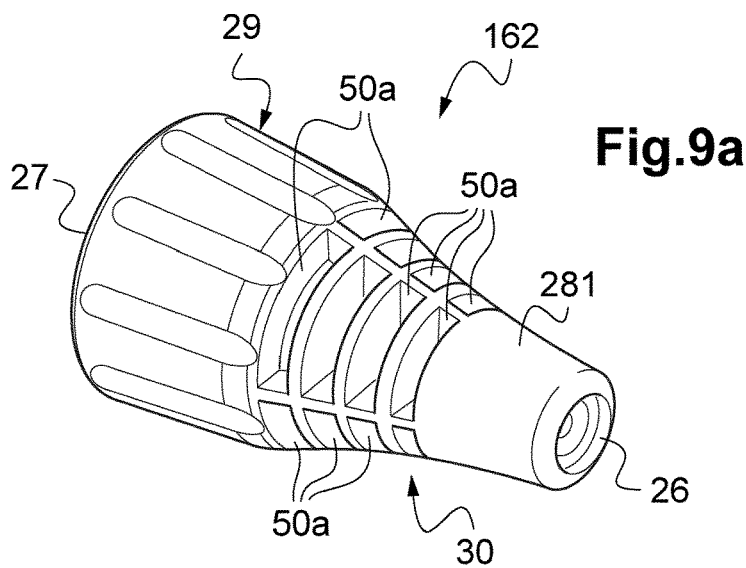
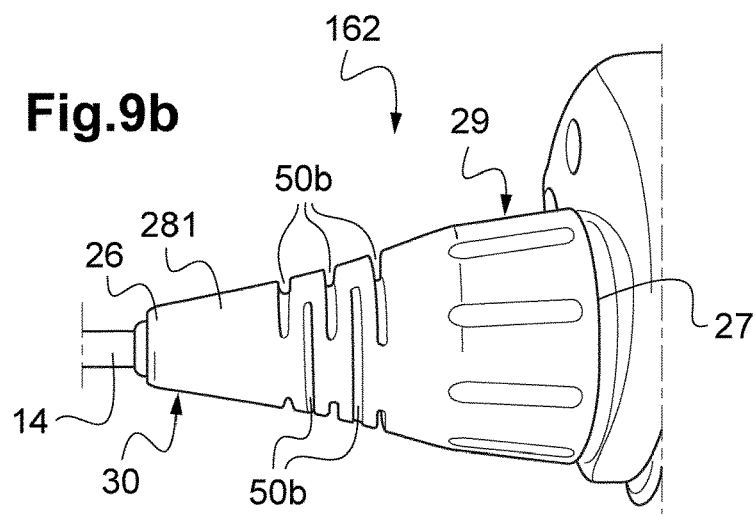

SNIFFER PROBE AND LEAK DETECTOR

The present invention relates to a sniffer probe and to a leak detector for monitoring the leaktightness of an object to be tested by means of tracer gas.

A known method for monitoring the leaktightness of an object consists in carrying out a test of "sniffing" a tracer gas. A leak detector connected to a sniffer probe is used to search for the possible presence of the tracer gas around an object to be tested that is filled with a generally pressurized tracer gas. This method involves the detection of the passage of the tracer gas through possible leaks from the object to be tested. The search is conducted by moving the end of the sniffer probe around the object to be tested, notably at those regions that might have weak spots in terms of leaktightness, such as around the seals.

However, undesired mechanical stresses may act on the probe during the search. The end piece tube notably may become jammed and be subjected to various types of mechanical loads such as twisting, tearing, crushing, etc. These stresses are amplified by a lever arm effect and may result in the probe being damaged or even broken.

One solution is to make an end piece in the form of a flexible pipe. However, the lack of rigidity makes positioning difficult. For example, it is not possible to locate a leak using just one hand and it is near-impossible to pinpoint with precision a detection zone.

Another solution consists in using an end piece made of deformable brass. This makes the end piece capable of absorbing certain mechanical stresses. However, this solution is not entirely satisfactory since, although facilitated, the positioning of the probe is not as easy and precise as for a rigid end piece. Moreover, this technique obliges the user to manually reshape the end piece after each use.

The present invention therefore has the aim of proposing an improved sniffer probe that at least partially solves an abovementioned drawback of the prior art.

To that end, one subject of the present invention is a sniffer probe for a leak detector for monitoring the leaktightness of an object to be tested by means of tracer gas, the sniffer probe comprising:
- an end piece created in the form of a rigid tube,
- a housing,
- a connection member connecting the end piece to the housing, and
- a sampling duct configured to sample a gas at a first end of the end piece,
- characterized in that the connection member comprises a main body that is elastically deformable such that it can adopt a deformed position, making it possible for the end piece to pivot when acted upon by a force and to return to the initial rest position.

This reduces the forces that can act on the connection member between the end piece and the housing during the search for leaks, without losing rigidity at the end piece. The fact of being able to twist the sniffer probe during use permits simple manipulation and facilitates access to certain search regions that might not be accessible with a non-deformable probe.

The sniffer probe may further comprise one or more of the features described hereinbelow, taken alone or in combination.

The connection member may be configured to allow the end piece to pivot about the initial rest position in a cone of vertex angle greater than 20°, such as greater than 40°. The connection member may be configured to allow the end piece to pivot about the initial rest position in a cone of vertex angle less than 200°, such as less than 180°. A range for the cone of vertex angle greater than 20° and less than 200°, such as greater than 40° and less than 180°, permits good flexibility of use.

The connection member may have a general shape that thins on the side of an inlet orifice of the connection member. The shape thus helps to obtain a connection member that is elastically deformable between the deformed position and the initial rest position.

The main body may be made of a single plastic or elastomeric material, such as an EPDM material. This material makes it possible to obtain a connection member that is easily elastically deformable between the deformed position and the initial rest position. This embodiment has the advantage of being simple to implement and low-cost.

The main body may be made of at least two materials having different respective hardnesses.

The connection member may comprise a metal insert configured to cooperate by assembly with a second end of the end piece. The insert makes it possible to facilitate assembly of the end piece.

The main body of the connection member may be overmoulded around the insert.

At least one radial cutout, for example in the shape of a circular sector or an arcuate striation (narrower), may be created in the main body of the connection member, around the sampling duct.

According to another embodiment example, the main body of the connection member may be made of a metal flexible pipe or bellows or spring.

The sniffer probe may comprise a filter comprising a filtering element arranged in a support of the filter, the filter being arranged in a recess of the main body of the connection member, the recess and the filter comprising complementary sealing means.

According to one embodiment example, the complementary sealing means are formed by a frustoconical lip of the recess of which the inclined walls cooperate with an inlet tube of the support of the filter and of which the summit is inserted into the inlet tube. This cooperation makes it possible to improve the leaktightness of the sampling duct at the connection between the main body and the filter, notably in order to ensure that the connection is leaktight even when the connection member is deformed and in order to ensure better flow of the gases, notably in order to not trap the tracer gas in the connection member.

The connection member and the housing may comprise complementary assembly means comprising an internal thread created in a base of the main body of the connection member and a threaded protuberance formed by the housing, the internal thread being configured to cooperate with the threaded protuberance.

It is also possible to make provision for the complementary assembly means to be configured to disassemble when the angle formed between the axis of the end piece in the deformed position of the connection member and the axis of the end piece in the rest position exceeds an angular threshold. The angular threshold is for example equal to or greater than 100°. These complementary assembly means that can disconnect in the event of excessive deformation make it possible to avoid the probe breaking.

The sniffer probe may comprise a flow restrictor mounted in an assembly part, this part being itself mounted in the threaded protuberance, the assembly part receiving an outlet tube of the filter.

Another subject of the invention is a leak detector comprising a base unit comprising a pumping device and at least one gas analysis unit, characterized in that it comprises a sniffer probe as described above connected to the base unit.

Other features and advantages of the present invention will become more clearly apparent upon reading the following detailed and entirely non-limiting description of a particular embodiment of the invention, with reference to the appended drawings, in which:

FIG. 8 is a view in longitudinal section of a detail of an end of the sniffer probe of FIG. 2.

FIG. 9a is a perspective view of a second embodiment example of the connection member.

FIG. 9b is a perspective view of a variant of the second embodiment example of the connection member.

In these figures, identical elements bear the same reference numbers.

The following embodiments are examples. Although the description refers to one or more embodiments, this does not necessarily mean that each reference relates to the same embodiment or that the features apply only to just one embodiment. Single features of different embodiments can also be combined or interchanged to provide other embodiments.

An "upstream" element is to be understood as one that comes before another in relation to the direction of flow of the gas that is to be pumped. By contrast, a "downstream" element is to be understood as one that comes after another in relation to the direction of flow of the gas that is to be pumped.

Figure 1:
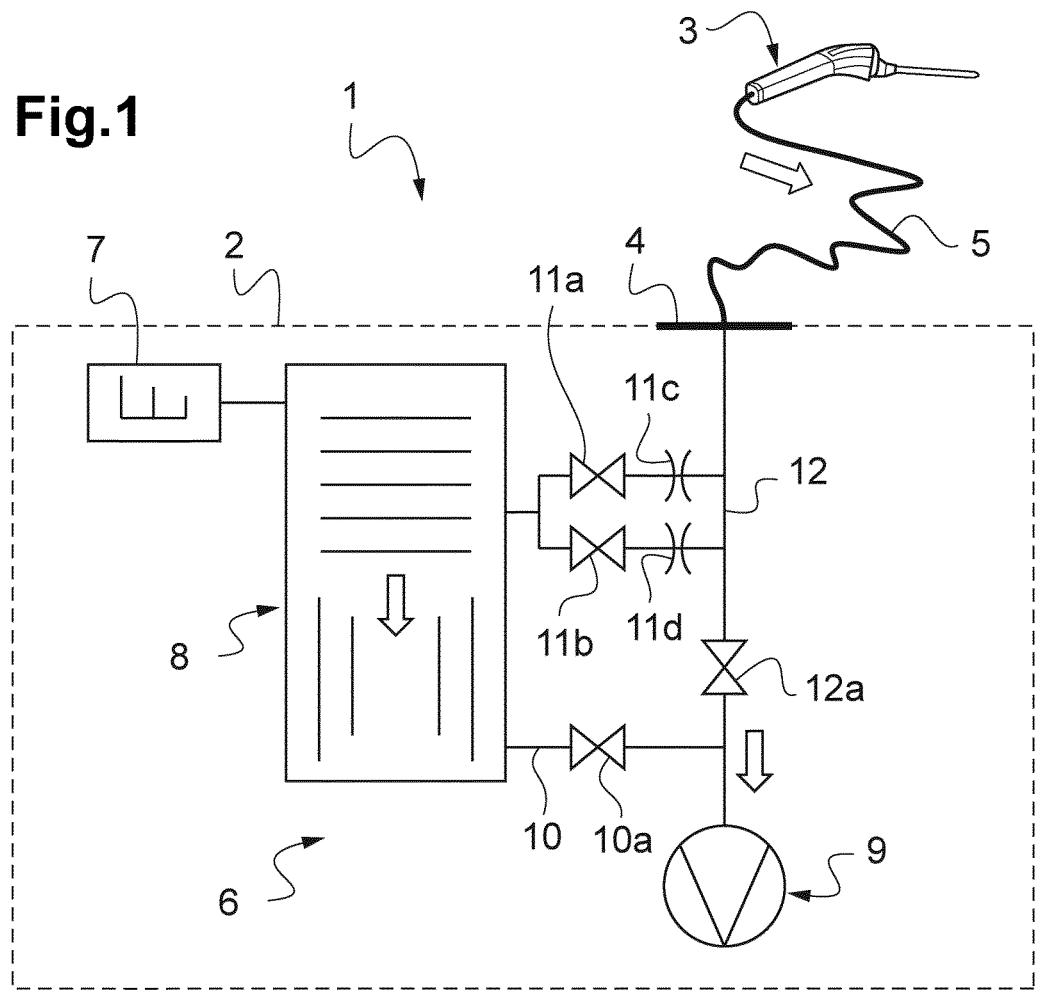
FIG. 1 is a schematic representation of an example of a leak detector.

FIG. 1 shows an example of a leak detector 1 for monitoring the leaktightness of an object to be tested by means of tracer gas.

The leak detector 1 comprises a base unit 2 and a sniffer probe 3 connected to a detection inlet 4 of the base unit 2, for example by a flexible pipe 5 by means of which the pumped gases can flow from the sniffer probe 3 towards the base unit 2 (the direction of flow of the gas that is to be pumped is shown by the arrows in FIG. 1).

The base unit 2 comprises for example a pumping device 6 and at least one gas analysis unit 7. The pumping device 6 comprises for example a turbomolecular vacuum pump 8 and a primary vacuum pump 9 that is connected to the output of the turbomolecular vacuum pump 8 by a first duct 10 which is provided with a first shutoff valve 10a.

The detection inlet 4 of the base unit 2 communicates with an intake of the turbomolecular vacuum pump 8, for example at a stage of the turbomolecular vacuum pump 8. There are for example multiple sampling valves 11a, 11b connected to a single intake of the turbomolecular vacuum pump 8, each one associated with a respective flow restrictor 11c, 11d. The flow restrictors 11c, 11d make it possible to control the flow rate of gas passing into the turbomolecular vacuum pump. They are distinct in order that it be possible to adapt the sampling flow to the level of the leakage rate by selecting the opening of one of the two sampling valves 11a, 11b.

The at least one sampling valve 11a, 11b is connected to a bypass of a second duct 12 arranged between the detection inlet 4 of the base unit 2 and the intake of the primary vacuum pump 9. A second shutoff valve 12a is connected to the second duct 12 between, on one hand, a branch connected to the at least one sampling valve 11a, 11b and to the detection inlet 4 and, on the other hand, a branch connected to the intake of the primary vacuum pump 9 and to the first shutoff valve 10a.

The gas analysis unit 7 is, for example, a mass spectrometer. It is connected to an inlet of the turbomolecular vacuum pump 8, for example to its intake or to a turbomolecular stage of the pump 8.

The leak detector 1 makes it possible to monitor the leaktightness of an object to be tested by moving the sniffer probe 3 around an object to be tested whose internal atmosphere contains tracer gas. Use is generally made of helium or hydrogen as tracer gas as these gases pass through small leaks more easily than other gases, owing to their molecules being small and fast.

In operation, the gas at atmospheric pressure surrounding the object to be tested is drawn in through the sniffer probe 3. Some of the gases to be analysed, which may contain the tracer gas indicative of a leak, is sampled by the gas analysis unit 7.

Figure 2:
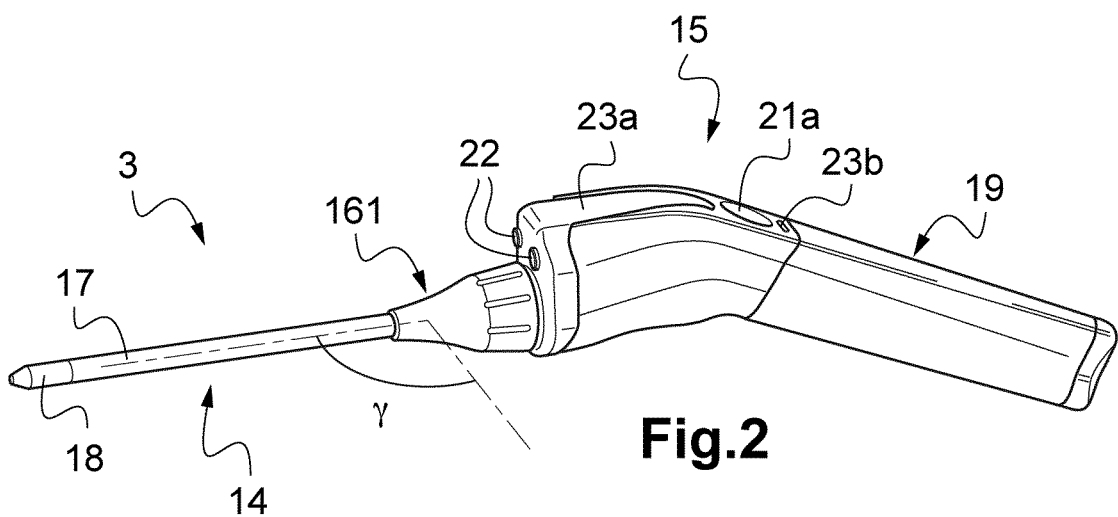
FIG. 2 is a perspective view of a sniffer probe of the leak detector of FIG. 1, in the initial rest position.
Figure 3:
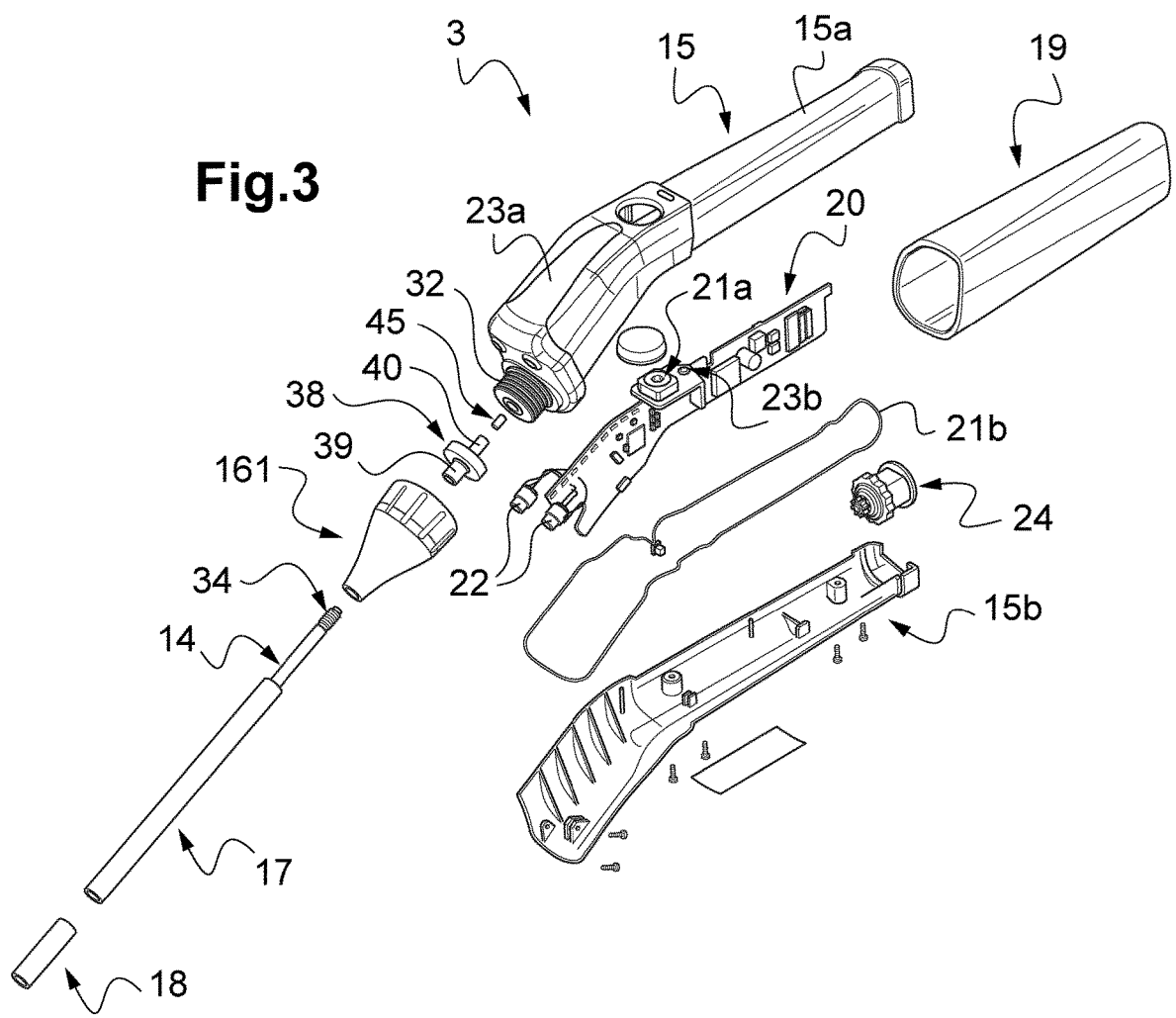
FIG. 3 is an exploded view of the sniffer probe of FIG. 2.

To that end, and as is better shown in FIGS. 2 and 3, the sniffer probe 3 comprises an end piece 14, a housing 15 and a connection member 161 connecting the end piece 14 to the housing 15.

The end piece 14 is made in the form of a rigid tube (or rod), which is for example straight. It is for example made of metal. It is said to be 'rigid' since it is designed to not easily deform under the effect of a force, notably one applied manually.

The sniffer probe 3 may also comprise a sleeve 17 and a cap 18, for example made of plastic material, surrounding the end piece 14. The cap 18 is screwed for example onto a first end 25 of the end piece 14 (shown more clearly in FIG. 8). The cap 18 is provided with an orifice for the gases to enter the probe.

The housing 15 is for example made in multiple portions, notably to allow assembly of the components. It may notably comprise two half-shells 15a, 15b, for example made in the form of a handle, and a gripping portion 19, partially surrounding the half-shells 15a, 15b, for a user to be able to grip the sniffer probe 3 (FIG. 3).

The housing 15 contains for example a control unit and a memory, that are carried by a circuit board 20, for controlling the electronic functionalities of the sniffer probe 3.

The control unit is notably connected to a control module of the base unit 2 of the leak detector 1, for example in order to permit remote control of the base unit 2, notably for zeroing the background noise or for controlling the sound volume of an emitter of the base unit 2.

The control unit is for example also connected to a user interface of the sniffer probe 3.

The user interface comprises, for example, one or more switches, for example in order to control the base unit 2, such as a switch of the pushbutton type 21a for zeroing the background noise, or such as a capacitive sensor for controlling one or more illuminating lights 22 borne by the housing 15 and supplied with power by the circuit board 20, or such as a capacitive detector 21b arranged in the housing 15, at the gripping portion 19, and configured to detect the sniffer probe 3 being grasped in order to control a cycle startup in which the suction is activated in the sniffer probe 3.

The user interface may also comprise display means, for example for displaying information coming from the base unit 2 such as the measured concentration of tracer gas in proportion to the switching on of a series of light-emitting diodes arranged under a translucent wall 23a of the housing 15, or as a light source 23b that changes colour, for example to indicate the state of the leak detector 1.

The display means may comprise a screen (not shown), for example for a digital display of the measured concentration of tracer gas, or may comprise, as previously mentioned, one or more light sources that make it possible for example to display information by way of a colour code and/or by way of the quantity of light and/or flashing.

The communication means between the sniffer probe 3 and notably between the control unit of the sniffer probe 3 and the base unit 2 may be wired or wireless.

When the communication means are wired, the electric wires allowing communication between the sniffer probe 3 and the base unit 2 on one hand, and on the other hand the flexible pipe 5 allowing the gas to be pumped to flow, are for example connected to the sniffer probe 3 in a single sheath of the flexible pipe 5, provided with a single connector that cooperates with a connector 24 that is complementary with the housing 15.

Figure 7:
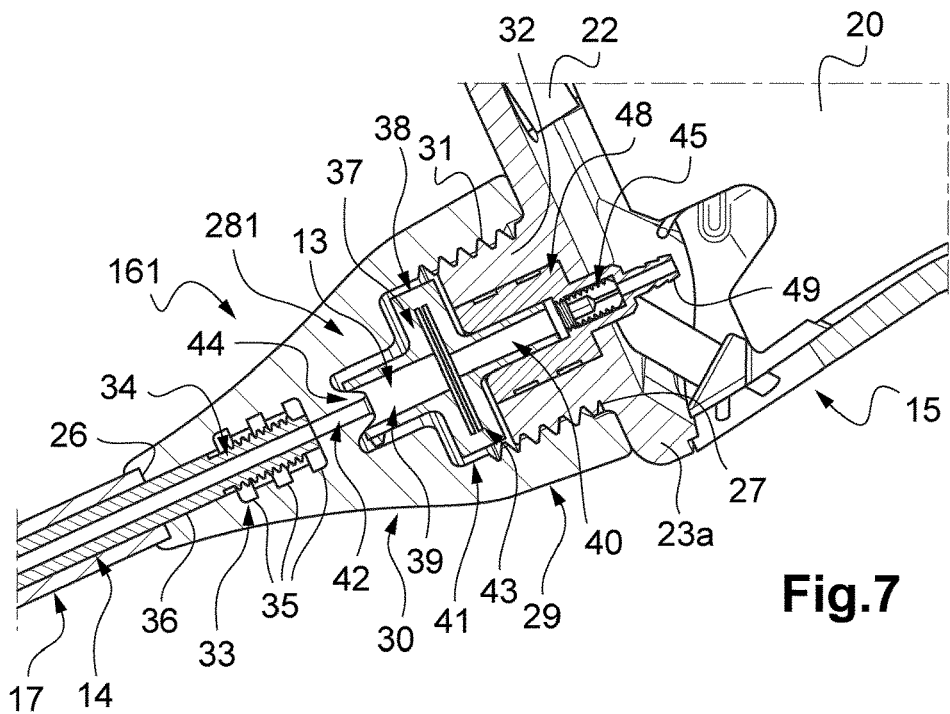
FIG. 7 is a view in longitudinal section of a central detail of the sniffer probe of FIG. 2.

Moreover, the sniffer probe 3 further comprises a sampling duct 13 for sampling a gas at the first end 25 of the end piece 14 (FIG. 7). Thus, the sampling duct 13 is formed in part by the end piece 14. It then passes through the connection member 161, then the housing 15, to the connector 24.

The connection member 161 comprises a main body 281 having an inlet orifice 26 and an outlet orifice 27, between which there is formed a portion of the sampling duct 13.

The main body 281 is elastically deformable such that it can adopt a deformed position, making it possible for the end piece 14 to pivot when acted upon by a force (FIG. 4) and to return to the initial rest position when no force is applied (FIG. 2).

Figure 4:
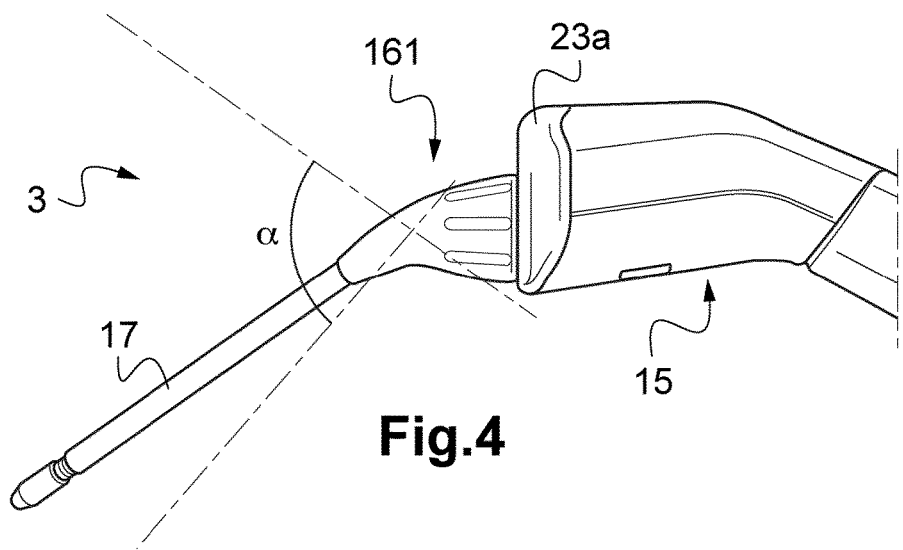
FIG. 4 is a view of the sniffer probe of FIG. 2 in the deformed position.

For example, the connection member 161 is configured to allow the end piece 14 to pivot about the initial rest position (without breaking and without disconnecting) in a cone of vertex angle α greater than 20°, such as greater than 40° (FIG. 4). The cone of vertex angle α is for example less than 200°, such as less than 180°. The cone of vertex angle α is for example an angle of 90°, plus or minus 10°.

Figure 5:
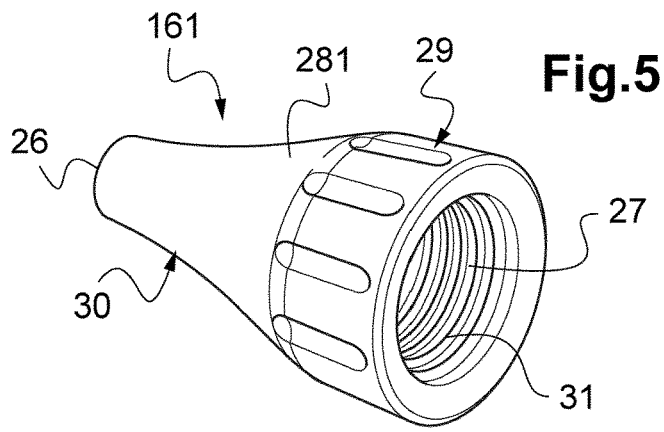
FIG. 5 is a perspective view of a first embodiment example of a connection member of the sniffer probe of FIG. 2.

Shown more clearly in FIG. 5, the main body 281 has for example a general shape that thins on the side of the inlet orifice 26, by virtue of which the connection member 161 can more easily deform on the side of the end piece 14.

More specifically, for example, the main body 281 of the connection member 161 has a frustoconical base 29 and a nose 30 whose diameter thins in the direction of the inlet orifice 26, the diameter of the base 29 being wider than the diameter of the nose 30. The thickness of the base 29 may also be bigger than the thickness of the nose 30. The shape thus helps to obtain a connection member 161 that is elastically deformable between the deformed position and the initial rest position.

The connection member 161 and the housing 15 may moreover comprise complementary assembly means, for example by screwing. These complementary assembly means comprise for example an internal thread 31 and a threaded protuberance 32. For example, an internal thread 31 is created in the base 29 of the main body 281 of the connection member 161. The internal thread 31 is configured to cooperate with a threaded protuberance 32 that is complementary with the housing 15 (FIGS. 3 and 7).

It is also possible to make provision for the complementary assembly means to be configured to disassemble when the angle formed between the axis of the end piece 14 in the deformed position of the connection member 161 and the axis of the end piece 14 in the rest position exceeds an angular threshold (FIG. 2). The angular threshold γ is for example equal to or greater than 100°. These complementary assembly means that can disconnect in the event of excessive deformation make it possible to avoid the probe 3 breaking.

To that end, the connection member 161 is for example configured in such a way that the threads of the threaded protuberance 32 leave the internal thread 31 owing to the elasticity of the connection member 161 when the deformation is too great. The connection member 161 is thus disconnected from the housing 15. All that is required to reconnect the end piece 14 is to screw the connection member 161 back onto the threaded protuberance 32.

According to one embodiment example, the main body 281 of the connection member 161 is made of a single elastomeric material, such as an EPDM (for ethylene propylene diene monomer). This material makes it possible to obtain a connection member 161 that is easily elastically deformable between the deformed position and the initial rest position. This embodiment has the advantage of being simple to implement and low-cost.

Figure 6:
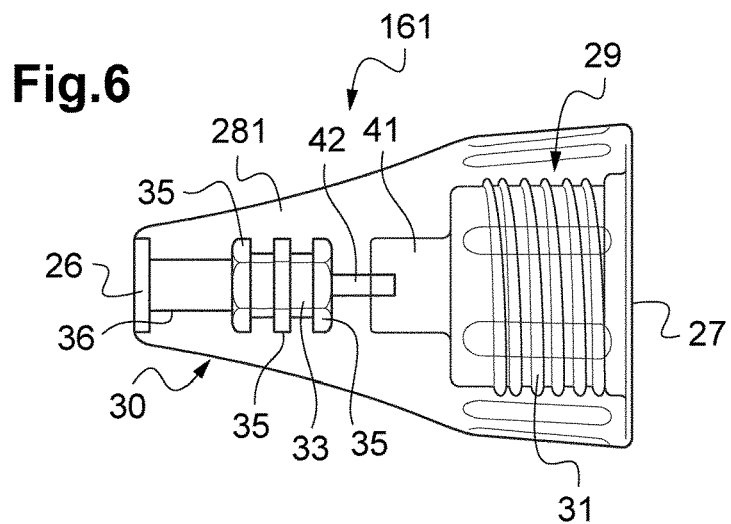
FIG. 6 is a view of the connection member of FIG. 5, with a main body depicted as transparent.

Moreover, and as can be seen in FIGS. 6 and 7, the connection member 161 may comprise a metal insert 33.

The insert 33 is configured to cooperate by assembly with a second end 34 of the end piece 14, for example by screwing.

The main body 281 of the connection member 161 is overmoulded for example around the insert 33. The insert 33 may furthermore comprise radial, for example annular, protuberances 35 that serve to improve the retention of the insert 33 in the main body 281.

The insert 33 is for example arranged at a distance from the inlet orifice 26 of the connection member 161, for example downstream of a cylindrical recess 36 for receiving the end piece 14, this being created in the connection member 161.

The insert 33 makes it possible to facilitate assembly of the end piece 14. It further makes it possible to substantially stiffen the side of the inlet orifice 26 of the connection member 161 in such a way that the deformation of the sniffer probe 3 take place principally between the cylindrical recess 36 of the nose 30 and the base 29 (FIG. 4).

Furthermore, the sniffer probe 3 may comprise at least one filter 37 arranged in the flow path of the gases, to filter dust.

According to one embodiment, which is clearer in FIG. 7, the filter 37 comprises at least one filtering element 43, such as a fine filter, arranged in a disc of a support 38.

The support 38 has for example an inlet tube 39 and an outlet tube 40 projecting from a respective face of the disc.

The support 38 is for example received in part in a recess 41 of the main body 281, communicating with the outlet orifice 27 of the connection member 161 in which the internal thread 31 is created. The recess 41 also communicates with a portion 42 of the sampling duct 13 of the connection member 161, this portion being interposed between the insert 33 and the recess 41.

According to one embodiment, the recess 41 comprises a frustoconical lip 44 of which the inclined walls cooperate with the inlet tube 39 of the support 38 of the filter 37 and of which the summit is inserted into the inlet tube 39. This cooperation makes it possible to improve the leaktightness of the sampling duct 13 at the connection between the main body 281 and the filter 37, notably in order to ensure that the connection is leaktight even when the connection member 161 is deformed and in order to ensure better flow of the gases, notably in order to not trap the tracer gas in the connection member 161.

The sniffer probe 3 may moreover comprise a coarse filter 46 for filtering large particles, such as a sintered metal filter, arranged upstream of the first end 25 of the end piece 14, in the cap 18 of the sniffer probe 3 (FIG. 8).

It will be noted that the filters 37, 46 can easily be removed from the sniffer probe 3 in order to be changed.

The sniffer probe 3 may further comprise a flow restrictor 45 arranged in the flow path of the gases, to reduce the flow rate of the flow drawn in, and thus allow the pumping of the gases at atmospheric pressure (FIG. 7). The flow restrictor 45 comprises for example a constriction, such as a ruby in which there has been created a hole of a few microns, which constriction is crimped in a brass screw.

The flow restrictor 45 is for example configured to be received in a portion of the sampling duct 13, this portion being created in the threaded protuberance 32 of the housing 15. The flow restrictor 45 is for example mounted in an assembly part 48 itself mounted in the threaded protuberance 32 and receiving the outlet tube 40 of the filter 37. More specifically, the brass screw is for example screwed into the assembly part 48.

The assembly part 48 is for example made of metal and may be overmoulded by the threaded protuberance 32 of the housing 15. The threaded protuberance 32 and the translucent wall 23a of the housing 15 are for example made in one piece.

The assembly part 48 may moreover comprise a connection 49, for example of the fir-tree type, that is suitable for being connected to a flexible connection pipe (not shown) interposed between the connection 49 and the connector 24 of the housing 15 of the sniffer probe 3. The flexible connection pipe forms that portion of the sampling duct 13 that is located inside the housing 15.

The passages through the flow restrictor 45 and the filter 37 are for example coaxial. The sampling duct 13 is for example straight between the first end 25 of the end piece 14 and the connection 49.

In use when searching for leaks, the main body 281 can deform elastically when acted upon by a force (FIG. 4) and return to the initial rest position after deformation in the absence of a force (FIG. 2).

This reduces the forces that can act on the connection member 161 between the end piece 14 and the housing 15 during the search for leaks, without losing rigidity at the end piece 14.

The fact of being able to twist the sniffer probe 3 during use also permits simple manipulation and facilitates access to certain search regions that might not be accessible with a non-deformable probe.

FIGS. 9a, 9b show another embodiment example of the connection member 162.

In this example, at least one radial cutout, for example in the shape of a circular sector 50a (FIG. 9a) or in the shape of an arcuate striation 50b (FIG. 9b), is moreover created in the main body 281 of the connection member 162, around the sampling duct 13, for example in the nose 30 of the connection member 162. The radial cutouts 50a, 50b are for example created between the cylindrical recess 36 and the base 29.

There are for example four rows of four radial cutouts 50a in the form of a circular sector, one row being formed of four radial cutouts 50a regularly distributed over a circle (FIG. 9a).

According to one variant embodiment, there are five radial cutouts 50b in the form of arcuate striations, the arc being at least semi-circular, the arcuate striations being arranged in alternation on opposite sides of the nose 30 (FIG. 9b).

The connection member 162 of this second embodiment exhibits good elastic behaviour; the sniffer probe 3 easily recovers its initial rest position after deformation.

Figure 10:
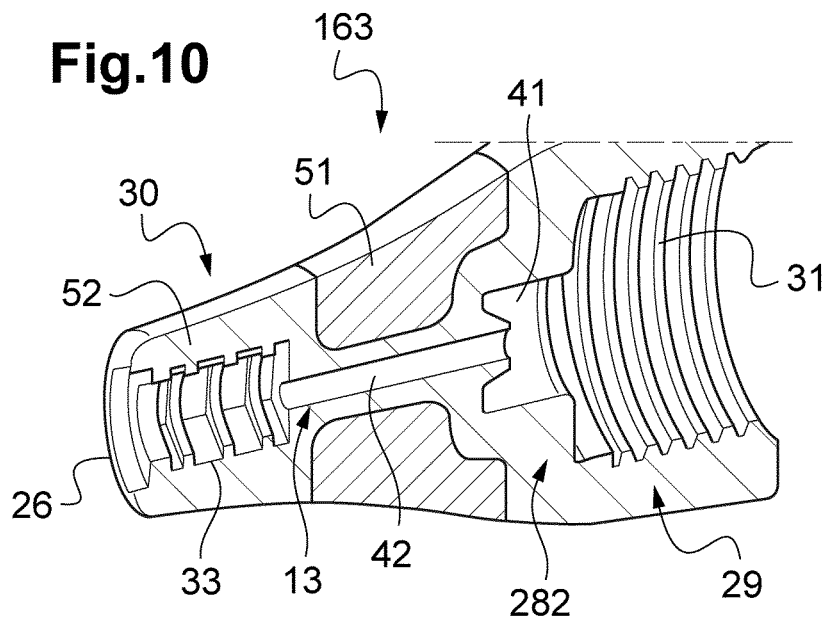
FIG. 10 is a schematic view of a third embodiment example of the connection member, with a main body depicted as transparent.

FIG. 10 shows another embodiment example of the connection member 163. In this example, the main body 282 is made of at least two materials 51, 52 having different respective hardnesses.

The main body 282 is for example made of two materials, for example created by injecting a first and a second material 51, 52 that are plastic or elastomeric, having different respective hardnesses.

The first, more flexible material 51 is for example formed by a ring surrounding the sampling duct 13 between the insert 33 and the recess 41 of the filter 37. The first, more flexible material 51 is for example encapsulated in the second, harder material 52 forming the rest of the main body 282.

This embodiment presents a good compromise between the flexibility and firmness required for the connection member 163 to be able to easily deform and recover its initial rest position.

Figure 11:
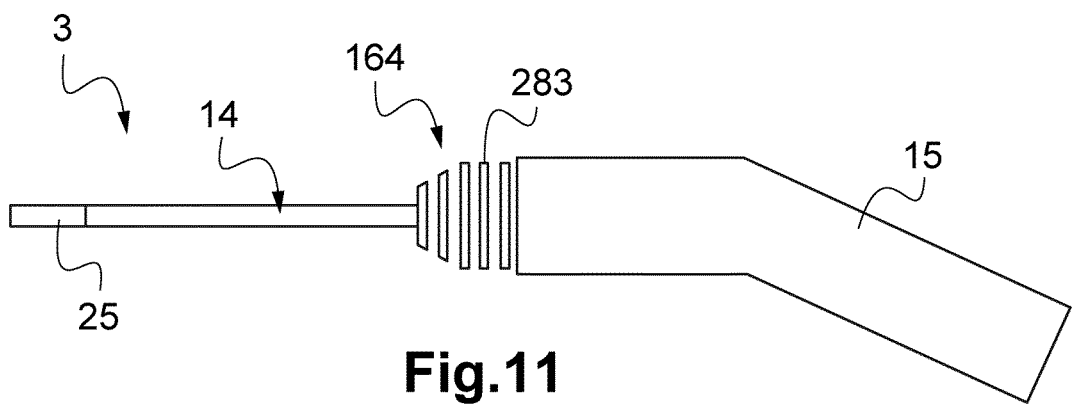
FIG. 11 is a highly schematic view of a fourth embodiment example of the sniffer probe.

FIG. 11 shows another embodiment example of the connection member 164. In this embodiment, the main body 283 of the connection member 164 is formed by a spring, for example of the compression coil spring type, or by a bellows or a flexible pipe (also termed 'Tombac'). It is for example made of metal, such as stainless steel.

The invention claimed is:

1. A sniffer probe for a leak detector for monitoring the leaktightness of an object to be tested by tracer gas, the sniffer probe comprising:
   an end piece created in the form of a rigid tube;
   a housing;
   a connection member connecting the end piece to the housing; and
   a sampling duct configured to sample a gas at a first end of the end piece,
   wherein the connection member comprises a main body that is elastically deformable such that, when acted on by a force, the end piece is pivoted from an initial rest position to a deformed position and, when the force is released, the end piece returns to the initial rest position, and
   wherein the main body is made of a single plastic or elastomeric material.

2. The sniffer probe according to claim 1, wherein the connection member is configured to allow the end piece to pivot about the initial rest position in a cone of vertex angle greater than 20°.

3. The sniffer probe according to claim 2, wherein the vertex angle is greater than 40°.

4. The sniffer probe according to claim 1, wherein the connection member is configured to allow the end piece to pivot about the initial rest position in a cone of vertex angle less than 200°.

5. The sniffer probe according to claim 4, wherein the vertex angle is less than 180°.

6. The sniffer probe according to claim 1, wherein the connection member has a general shape that thins on the side of an inlet orifice of the connection member.

7. The sniffer probe according to claim 1, wherein the main body is an EPDM material.

8. The sniffer probe according to claim 1, wherein the connection member comprises a metal insert configured to cooperate by assembly with a second end of the end piece.

9. The sniffer probe according to claim 1, wherein at least one radial cutout is created in the main body of the connection member around the sampling duct.

10. The sniffer probe according to claim 9, wherein the at least one radial cutout is in the shape of a circular sector or an arcuate striation.

11. The sniffer probe according to claim 1, further comprising a filter comprising a filtering element arranged in a support of the filter, the filter being arranged in a recess of the main body of the connection member, the recess and the filter comprising complementary sealing means.

12. The sniffer probe according to claim 11, wherein the complementary sealing means are formed by a frustoconical lip of the recess of which the inclined walls cooperate with an inlet tube of the support of the filter and of which the summit is inserted into the inlet tube.

13. The sniffer probe according to claim 1, wherein the connection member and the housing comprise complementary assembly means, the complementary assembly means comprising an internal thread created in a base of the main body of the connection member and a complementary threaded protuberance formed by the housing, the internal thread being configured to cooperate with the complementary threaded protuberance.

14. The sniffer probe according to claim 13, further comprising:
a filter comprising a filtering element arranged in a support of the filter, the filter being arranged in a recess of the main body of the connection member, the recess and the filter comprising complementary sealing means; and
a flow restrictor mounted in an assembly part, the assembly part being mounted in the threaded protuberance, the assembly part receiving an outlet tube of the filter.

15. The sniffer probe according to claim 14, wherein the complementary assembly means are configured to disassemble when the angle formed between the axis of the end piece in the deformed position of the connection member and the axis of the end piece in the rest position exceeds an angular threshold.

16. A leak detector comprising:
a base unit comprising a pumping device and at least one gas analysis unit; and
the sniffer probe according to claim 1 connected to the base unit.

17. The sniffer probe according to claim 1, wherein a diameter of the connection member is greater than a diameter of the end piece.

18. The sniffer probe according to claim 1, wherein a length of the end piece is greater than a length of the connection member.

* * * * *